United States Patent
Grimaud et al.

(10) Patent No.: US 10,773,466 B1
(45) Date of Patent: Sep. 15, 2020

(54) CONSUMER-DRIVEN PERSONALIZATION OF THREE-DIMENSIONAL OBJECTS

(71) Applicant: Dassault Systemes SolidWorks Corporation, Waltham, MA (US)

(72) Inventors: Jean-Jacques Grimaud, Waltham, MA (US); Igor Kaptsan, Waltham, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 579 days.

(21) Appl. No.: 15/167,220

(22) Filed: May 27, 2016

Related U.S. Application Data (63) Continuation-in-part of application No. 14/790,680, filed on Jul. 2, 2015, now Pat. No. 9,919,478.

(51) Int. Cl.
| | |
|---|---|
| *B29C 67/08* | (2006.01) |
| *B29C 67/00* | (2017.01) |
| *H04L 29/08* | (2006.01) |
| *G05B 15/02* | (2006.01) |
| *B33Y 50/02* | (2015.01) |

(52) U.S. Cl.
CPC .......... *B29C 67/0088* (2013.01); *B33Y 50/02* (2014.12); *G05B 15/02* (2013.01); *H04L 67/02* (2013.01)

(58) Field of Classification Search
None
See application file for complete search history.

(56) References Cited

U.S. PATENT DOCUMENTS

| 9,919,478 B2 | 3/2018 | Grimaud |
| 2011/0087350 A1* | 4/2011 | Fogel ................. G06F 17/50 |
| | | 700/98 |

(Continued)

FOREIGN PATENT DOCUMENTS

| JP | H07-324212 | 12/1995 |
| JP | 2010-187952 | 9/2010 |

(Continued)

OTHER PUBLICATIONS

3DVIA Make; Elevate Your Business With Product Collaborative Personalization. http://www.3ds.com/products-services/3dvia/space-planning-software/make/ retrieved from Internet Feb. 24, 2016.

(Continued)

*Primary Examiner* — Robert A Cassity
(74) *Attorney, Agent, or Firm* — Hamilton, Brook, Smith & Reynolds, P.C.

(57) ABSTRACT

A computer-implemented method and system create a three-dimensional (3D) model of a personalized object that represents of a real-world physical product. The 3D model contains one or more symbol parts, where each of the symbol parts is a computer representation of a symbol and a 3D font determines the shape of each of the symbol parts. A user interface is provided to enable a user to specify the symbol parts to personalize the real-world physical product. A transformation operation is performed, which transforms the 3D model in any one of the six degrees of freedom and enables a user to visualize in three dimensions on a computer screen a representation of the physical product prior to purchase.

20 Claims, 6 Drawing Sheets

(56) References Cited

U.S. PATENT DOCUMENTS

| | | | |
|---|---|---|---|
| 2011/0313837 A1 | 12/2011 | Norman | |
| 2011/0313878 A1* | 12/2011 | Norman | G06Q 30/06 |
| | | | 705/26.5 |
| 2013/0207972 A1 | 8/2013 | Wu | |
| 2013/0304604 A1* | 11/2013 | Hoffman | G06Q 30/0621 |
| | | | 705/26.5 |
| 2015/0111623 A1* | 4/2015 | Hegemier | H04M 1/0283 |
| | | | 455/575.1 |
| 2015/0235069 A1 | 8/2015 | Kumar et al. | |
| 2015/0359609 A1* | 12/2015 | Khan | A61C 7/002 |
| | | | 433/6 |
| 2015/0370926 A1 | 12/2015 | Savage et al. | |
| 2016/0007852 A1* | 1/2016 | Warner | A61B 5/0035 |
| | | | 600/374 |
| 2016/0059489 A1* | 3/2016 | Wang | H04L 67/16 |
| | | | 700/119 |
| 2016/0086258 A1* | 3/2016 | Romes | G06Q 30/0641 |
| | | | 705/27.1 |
| 2016/0185043 A1* | 6/2016 | Klappert | B29C 67/0088 |
| | | | 264/40.1 |
| 2017/0001376 A1 | 1/2017 | Grimaud | |

FOREIGN PATENT DOCUMENTS

| | | |
|---|---|---|
| JP | 2015-112836 | 6/2015 |
| KR | 2013 0110764 | 10/2013 |

OTHER PUBLICATIONS

EP Search Report for EP 16 17 6886 dated Feb. 21, 2017 entitled "3D Fonts For Automation Of Design For Manufacturing".

* cited by examiner

CONSUMER-DRIVEN PERSONALIZATION OF THREE-DIMENSIONAL OBJECTS

RELATED APPLICATION(S)

This application is a continuation-in-part of application Ser. No. 14/790,680, filed on Jul. 2, 2015. The entire teachings of the above application(s) are incorporated herein by reference.

BACKGROUND OF THE INVENTION

Numerous retailers allow customers to order personalized products using an online store. In general, to personalize a product, an online customer enters the desired characters and/or symbols in an online form. Personalized products include, by way of non-limiting example, products that contain or are monograms or an individual's name, and products that contain an individualized message, a saying, and meaningful symbols. The online store may not, however, display the personalized product so that the customer may preview an image of what will be the actual, physical personalized product. The personalized product is generally built on some additional support material, such as a bar-shaped object, or a round-shaped or heart-shaped frame. Additionally, a template may predefine a position and orientation of the letters and symbols. Further, the customer may only be shown a two-dimensional static image on a computer screen of an example of what a personalized product could look like. Generally, the customer is not shown what the final piece will look like as an actual product or on a representation of an actual product with the personalized characters and/or symbols.

Once a personalized order is submitted, a graphic designer may work with a two-dimensional software product to create an outline of the personalized product. Once done, the graphical representation of the product will be used in manufacturing the product by a laser cutting process or an embossing process by way of non-limiting example.

A disadvantage of the current state of the art of designing and manufacturing personalized products is the lack of scalability with respect to the volume of products that may be designed and manufactured in a given time period, exemplified by the need to have a graphic designer involved in the process. Another disadvantage is that typically the personalization is in a fixed position of the product (e.g., a name engraved horizontally on a pendant) according to a predefined template, so that each letter or symbol occupies a specific absolute and/or relative position and orientation on the final product. Another disadvantage is that the letters or symbols cannot be individually scaled in size, rotated, or translated. A further disadvantage is that the retail price of the product may be determined without knowledge of the font type, the length of the personalization, or amount of material needed for manufacturing the product. For example, the actual cost of a metal used to manufacture two jewelry pieces having characters of the same size, one in the shape of the name Ann and the other in the shape of the name Christianna, will differ; whereas the retail price to the customer may not.

SUMMARY OF THE INVENTION

The present invention addresses these disadvantages by utilizing a three-dimensional (3D) computer system to (a) enable a customer (including those unfamiliar with the use of computer-aided design systems), to specify and design the personalization, (b) enable a customer to manipulate the entire personalization and individual pieces of the personalization using all six degrees of freedom, and (c) to aid in the determination of the cost of materials to manufacture the product and the final price of the product. Moreover, as will be apparent, the present invention leads to an enhanced customer experience.

In general, in one aspect, embodiments of the invention feature a computer-implemented method for designing a personalized object on a computerized system. A three-dimensional (3D) model of the personalized object is created. The personalized object is a representation of a real-world physical product. The 3D model contains one or more symbol parts. A 3D font determines the shape of each symbol part. Furthermore, a user interface is provided and enables a user to specify the symbol part, thereby indicating a personalization of the real-world physical product. A transformation operation is performed that transforms the 3D model in any one of the six degrees of freedom, thereby enabling a user to visualize in three dimensions on a computer screen a representation of the physical product with the personalization.

Other embodiments include a computer-aided design system having a processor operatively coupled to a data storage system, where the data storage system stores a three-dimensional (3D) model. The data storage memory is operatively coupled to the processor has instructions that cause the system computer to create the three-dimensional model. The 3D model is a design for a personalized object. The personalized object is a representation of a real-world physical. The 3D model contains one or more symbol parts, where each symbol part is a computer representation of a symbol. A 3D font determines the shape of each symbol part. Furthermore, a user interface is provided and enables a user to specify the symbol parts, thereby indicating a personalization of the real-world physical product. A transformation operation is performed that transforms the 3D model in any one of the six degrees of freedom, thereby enabling a user to visualize in three dimensions on a computer screen a representation of the physical product with the personalization.

Yet other embodiments include a non-transitory computer-readable data storage medium comprising instructions that cause a computer to create a three-dimensional (3D) model. The 3D model is a design for a personalized object. The personalized object is a representation of a real-world physical. The 3D model contains one or more symbol parts, where each symbol part is a computer representation of a symbol. A 3D font determines the shape of each symbol part. Furthermore, a user interface is provided and enables a user to specify the symbol parts, thereby indicating a personalization of the real-world physical product. A transformation operation is performed that transforms the 3D model in any one of the six degrees of freedom, thereby enabling a user to visualize in three dimensions on a computer screen a representation of the physical product with the personalization.

Other aspects of the invention include the transformation operation transforming the symbol parts of the 3D model simultaneously, and the transformation operation transforming only one symbol part of the 3D model. Moreover, the user interface may enable a user to specify a material type, a 3D font type, a size of each symbol part, a position of each symbol part, an orientation of each symbol part, and any combination of one or more thereof.

Still other aspects of the invention include calculating the cost of the real-world physical product given a size of the 3D model. The cost may be updated dynamically when the size of the 3D model changes or when a different material is selected.

Further embodiments of the invention transmit data defining a manufacturing process for creating the real-world physical product. The manufacturing process may create the real-world physical product by a 3D printing process, an engraving process, a stamping process, or an embroidering process.

Additionally, the user may specify the personalization within an online store and submit an order for the real-world physical product with the personalization.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

DETAILED DESCRIPTION OF THE INVENTION

The present invention relates to the creating and manufacturing of customized products that contain three-dimensional (3D) symbols. (Hereinafter, the meaning of the word symbols includes characters such as letters and numbers.) Jewelry design and other fields where products are personalized will benefit from the implementation of the present invention, and not only because the present invention improves the customer experience, but also because the present invention provides the customer many options with regards to personalizing a product design according to that customer's esthetic judgment and creativity. For example, instead of an online store showing a static image of an example of a non-customized monogrammed product, a customer has access to a full 3D representation of the monogram, may change the characters of the monogram, and may manipulate the characters together or individually, each using six degrees of freedom. Furthermore, the customer may choose from a database of 3D fonts, the relative placement of each symbol, the size and orientation of each symbol, and the thickness of each symbol. Importantly, the customer works on the object itself.

The value of a product designed using the present invention is enhanced by customer involvement in the design. The design becomes a consumer-driven one-of-a kind design. The customer seeing more exactly what is being ordered is likely to become emotionally involved in the product. This may result in a higher rate of purchase of a product and the acceptance by the customer of a higher price point for the product.

Figure 1:
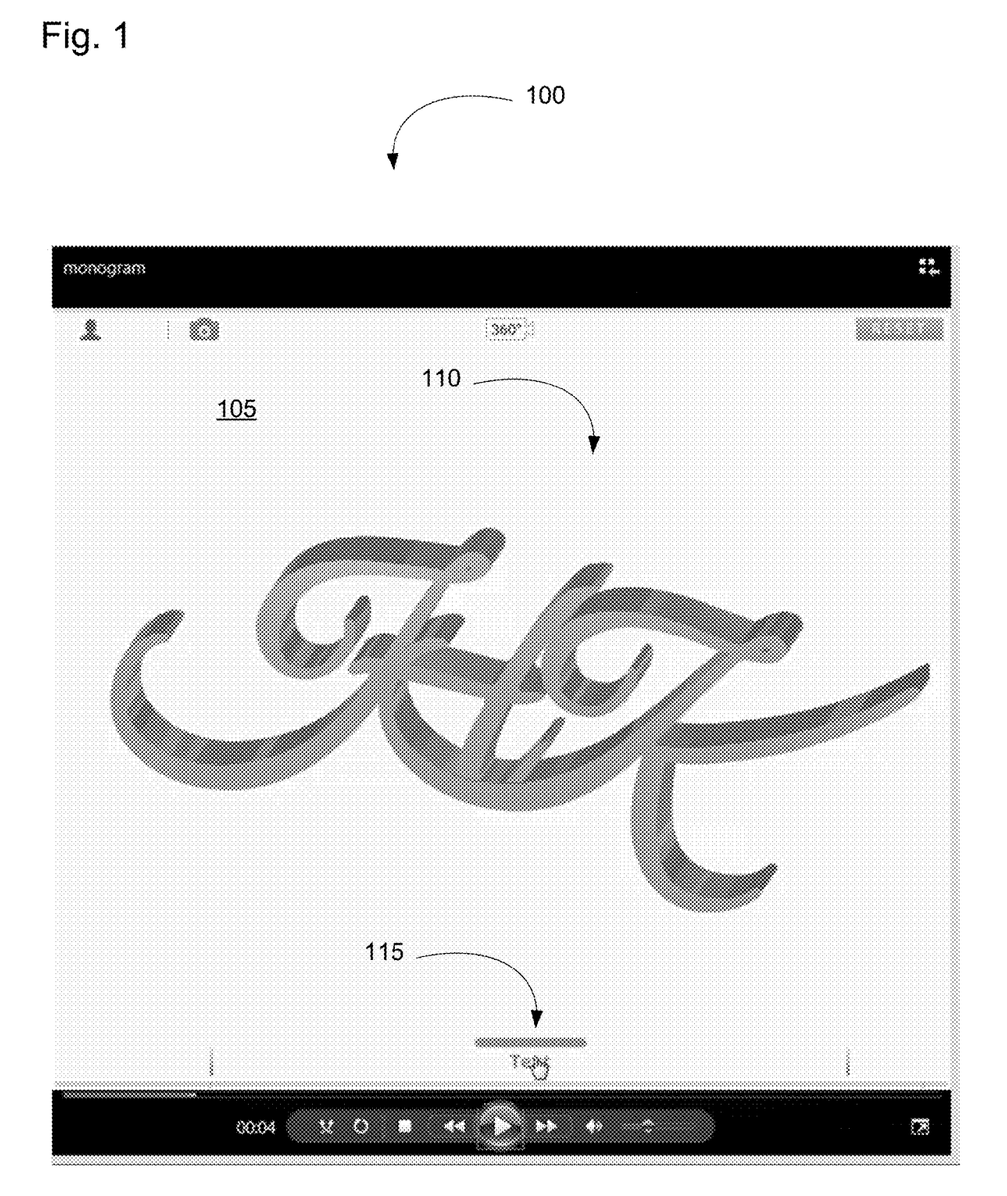
FIG. 1 is an illustration of a 3D model in the shape of a monogram.

Referring to FIG. 1, an example embodiment of the present invention is shown. A window 100 displayed on a computer screen contains a preview area 105 in which a 3D monogram 110 is displayed. The 3D monogram 110 contains the letters h and k, which may have been created by a computer-aided design solid modeling system such as SOLIDWORKS® CAD software, available from Dassault Systemes SolidWorks Corporation of Waltham, Mass. The window 100 may be placed in an area of an online store's webpage and is an interactive area where the customer may interact with the solid modeling system, executing on a server perhaps. Enabling the window 100 to be interactive may be accomplished by, for example, creating an IFrame (i.e., a document embedded inside another document on a website), in a webpage whereby content can be loaded in the IFrame of that webpage and behaves independent of other areas of that webpage. As shown in FIG. 1, a Text bar 115 acts as a toggle control. When selected, the Text bar 115 reveals or conceals a user interface (UI) area.

Figure 2:
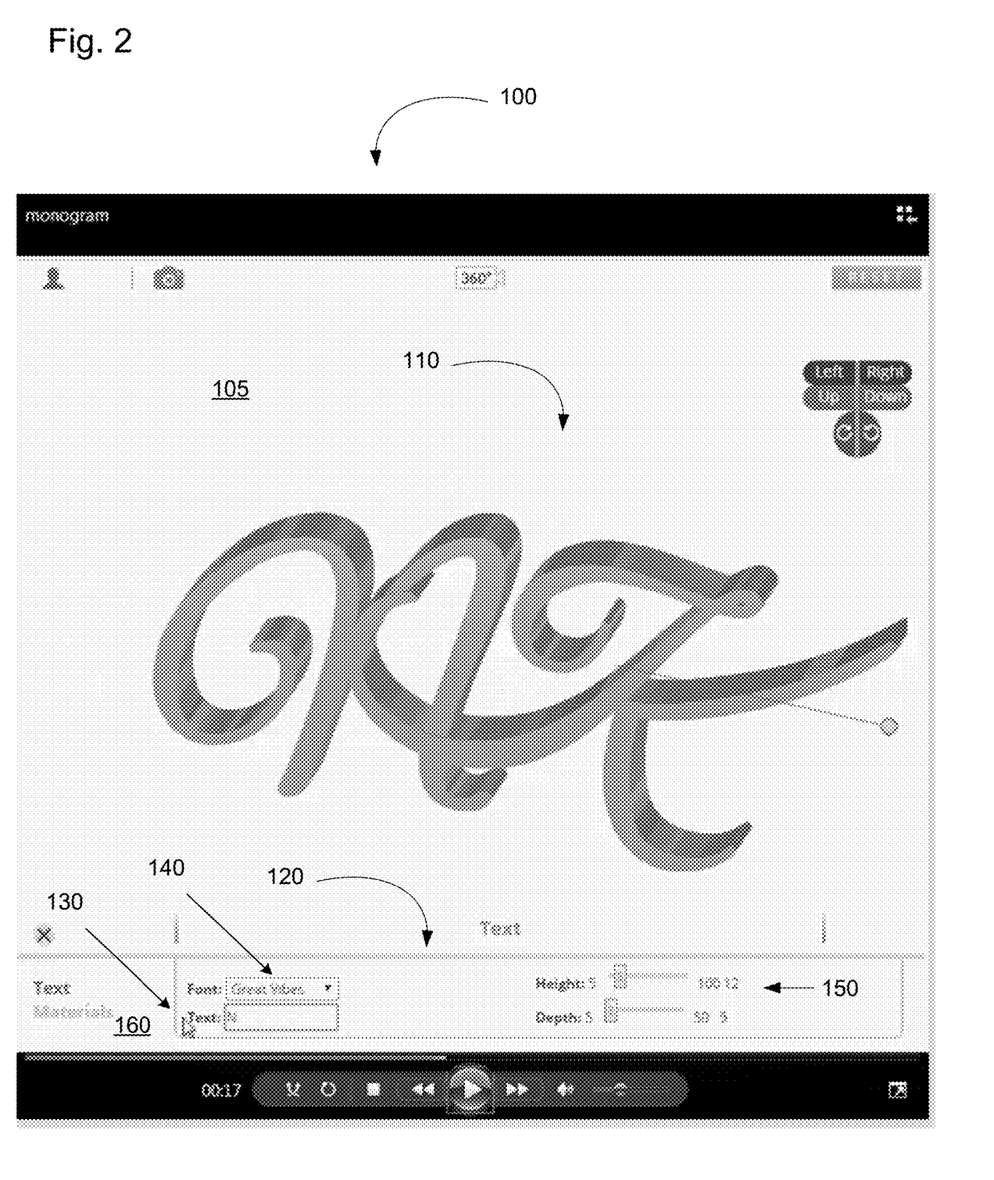
FIG. 2 is an illustration of a 3D model in the shape of a monogram.

In FIG. 2, the 3D monogram 110 contains the letters n and k and the UI area 120 is visible. The UI area 120 enables a user to enter text in a Text data entry area 130. An N appears in the Text data entry area 130 and the left symbol in the 3D monogram 110 is now an n reflecting the character entered in the Text data entry area 130. The UI area 120 also enables a user to select a 3D font type from a pull-down menu 140, and change the height and width of the 3D monogram using UI slider controls 150. An embodiment of the present invention may also enable the width of the 3D monogram 110 to be modified using a UI slider. In addition, a Text Materials area 160 may be selected to specify a type of material of which the symbols and/or the entire physical product will be manufactured. The types of material may be pre-defined attributes. Other pre-defined attributes may include texture (e.g., brushed gold and matte gold). The user may also change the position of the 3D monogram 110 in the window 100 using a pointing device such as a mouse or a stylus; a finger on a touchscreen device may also send signals to apply a transformation to the 3D monogram 110.

Figure 3:
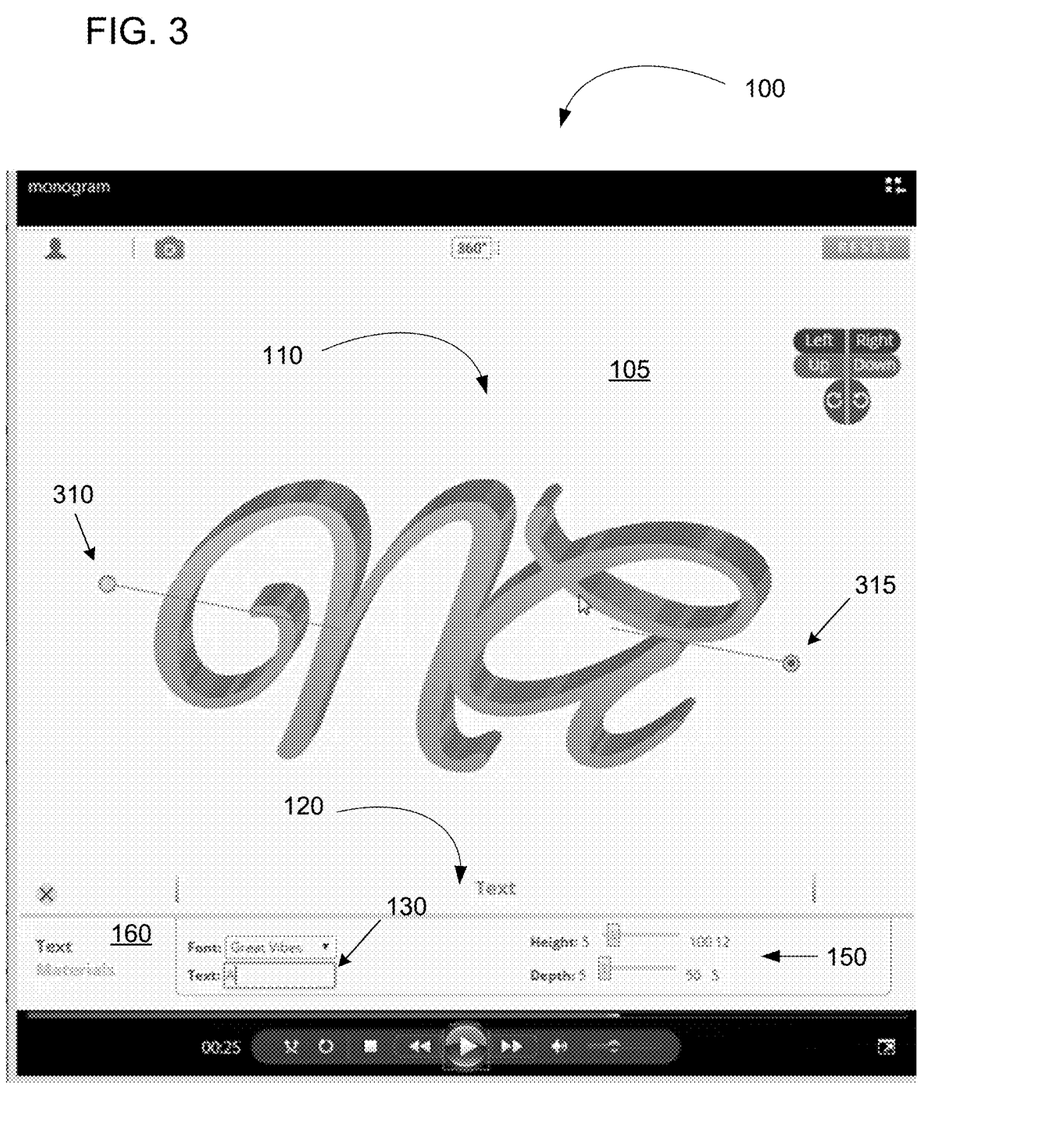
FIG. 3 is an illustration of a 3D model in the shape of a monogram.

Referring now to FIG. 3, the rightmost letter has changed from a k to an a after entering an A into the Text data entry area 130. Manipulation handles 310, 315 have been added to the preview area 105 to enable the transformation of the letters individually and as a selection tool such that a user may select one of the letters.

Figure 4:
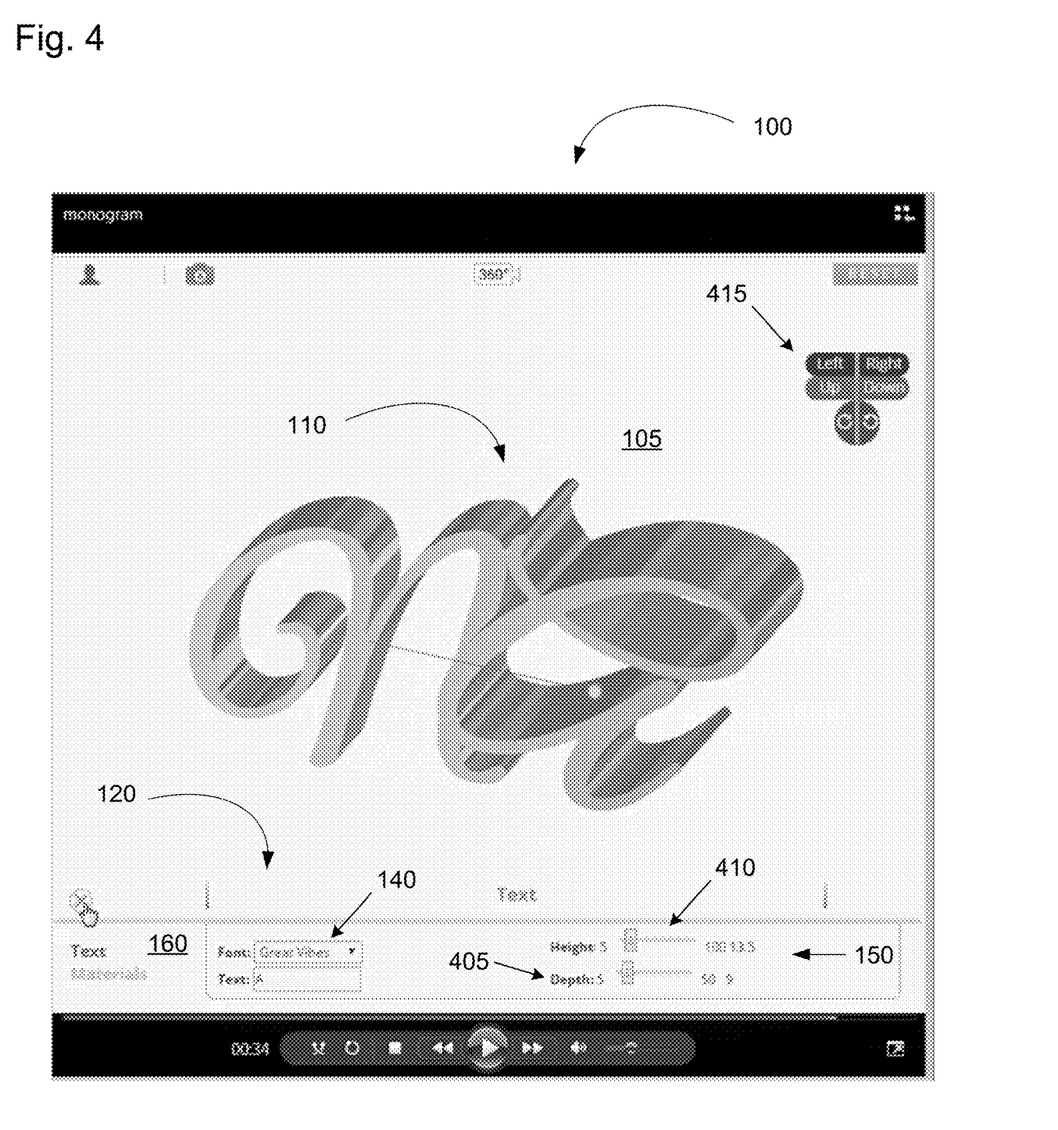
FIG. 4 is an illustration of a 3D model in the shape of a monogram.

FIG. 4 illustrates a change in depth and height of the letter a. The depth of the letter a was increased using the UI slider control labeled Depth 405; whereas, the height of the letter a increased using the UI slider control labeled Height 410. Likewise, the depth of a letter and the height of a letter may be decreased using UI slider labeled Depth 405 and UI slider labeled Height 410, respectively.

Symbols may be rotated and scaled individually or together. The UI transformation controls 415 enable the user to translate and rotate the 3D monogram 110 or one symbol thereof about the x, y, and z axes. When rotated individually, a point of attachment between a symbol selected for rotation and a symbol beside that selected symbol is used as the point about which the rotation occurs. If more than one symbol is attached to the selected symbol (e.g., a symbol on the left side and a symbol on the right side of the selected symbol), a user may select which attached symbol the selected symbol will use as the origin of rotation. Whether the rotation is about the x, y, or z axis may also be user selectable. A user may design a bracelet in this manner, with the symbols aligned on an arc representing the curvature of the physical bracelet to be manufactured. Likewise, letters in a word may be arranged in a circular fashion with the base of each letter being the closest part of the letter to the center of a piece. Moreover, instead of the user rotating and/or positioning each symbol individually, the user may draw a curve in the preview area 105 and the symbols will align to the curve.

Figure 5:
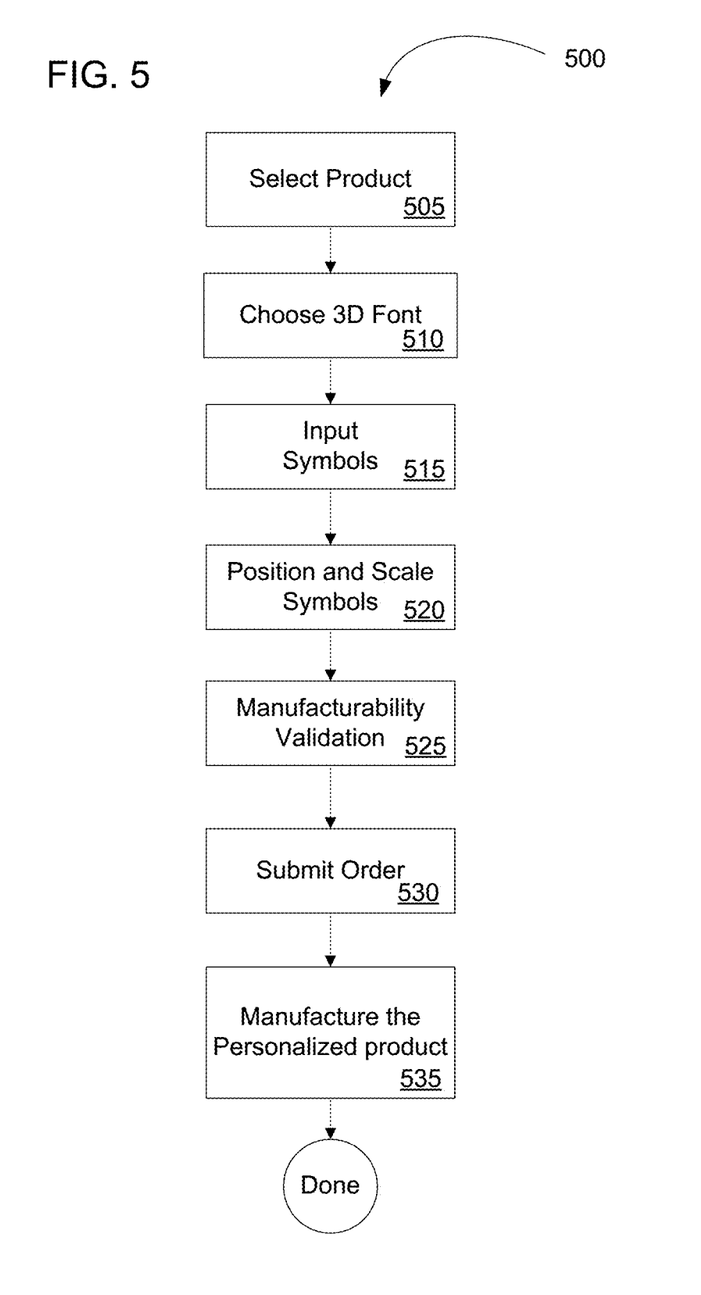
FIG. 5 is flow diagram containing steps for designing a customized item.

FIG. 5 illustrates the work flow 500 in an embodiment of the present invention. To begin, a customer chooses a product of interest to personalize (step 505). The product of interest may be selected from a webpage of an online store that shows a non-customized example of the product of interest. The customer may then choose among a number of 3D fonts in which to display the symbols (step 510). When the customer selects a 3D font, the customer receives immediate feedback with regards to the appearance of the product because the personalized aspects of the product are immediately modified to appear on the computer screen in the newly selected 3D font.

In the next step, the customer personalizes the product by entering numbers, letters, or other symbols via a keyboard (step 515). Other input devices may also be used. For example, the online store may have voice recognition capabilities and the customer may speak into a computer and thereby specify the personalization. In the next step, the symbols may be positioned and scaled (step 520). For example, the entire 3D model representing the personalized product may be translated, rotated, and scaled. By way of non-limiting example, instead of a name being engraved horizontally in the middle of a pendant, the engraved name may be rotated to a slanting position and translated such that the name is not centered on the pendant. Additionally, each symbol may be selected individually and then translated, rotated, and/or scaled by itself, as previously discussed.

Prior to submitting the order, a manufacturing validation process analyzes the 3D model and checks the geometry of the 3D model (step 525). The purpose of the manufacturing validation process is to ensure that the 3D model may be used to manufacture the product that the 3D model represents. Some manufacturing processes do not allow gaps, so gaps are checked if the product is to be manufactured by such a process. (Depending on the product, a particular manufacturing process may automatically be selected.) Additionally, certain materials may require that the thickness of the manufactured product be at least a certain value. The manufacturing validation process ensures that the geometry will result in an end product having at least that thickness. If the manufacturing validation process determines that the design cannot be manufactured, the user will be informed what the issue(s) are and directed to change the design to correct those issues.

During the entire workflow 500, the product may be visualized in real-time on the computer screen before and after the product is personalized, as well as while the product is being personalized. A high-quality, real-time rendering process may be implemented to create a photorealistic visualization of the product. The customer may then submit an order for the personalized product (step 530). After the order is submitted, the personalized product may automatically be manufactured (step 535). For example, data defining the 3D model may be reformatted and stored such that a 3D printer or a robot may input the data to manufacture the product. After the customer submits the order, the data may be sent directly to a 3D printer or robotic mechanism. Embodiments of the present invention may engrave, embroider, laser cut, stamp, and 3D print the personalization on the product.

As previously discussed, the cost to manufacture a product varies depending on the actual size of the personalized product and the type of material the customer specified to make the product. The 3D model stores size information for each symbol and may store the overall size information for all symbols in a personalized product or calculate the overall size when needed. An embodiment calculates the amount of material needed to manufacture a product of the overall size. This calculation may use as input the size of the individual symbols in the product, or the size of a volume of a 3D solid model of the personalization. Further, given the material selected (e.g., 14-carat gold or silver), the present invention can calculate the cost and input the values to a pricing process to determine the price to offer the product for sale. In an embodiment, as the customer is designing the personalized product, a final price of the product to the customer (i.e., cost to manufacture, cost to ship, and a vendor mark-up cost) is shown in real-time and changes dynamically in real-time as the customer specifies a material type, changes the symbols in the personalization, changes the font type, or changes the size of the personalization, by way on non-limiting example.

Figure 6:
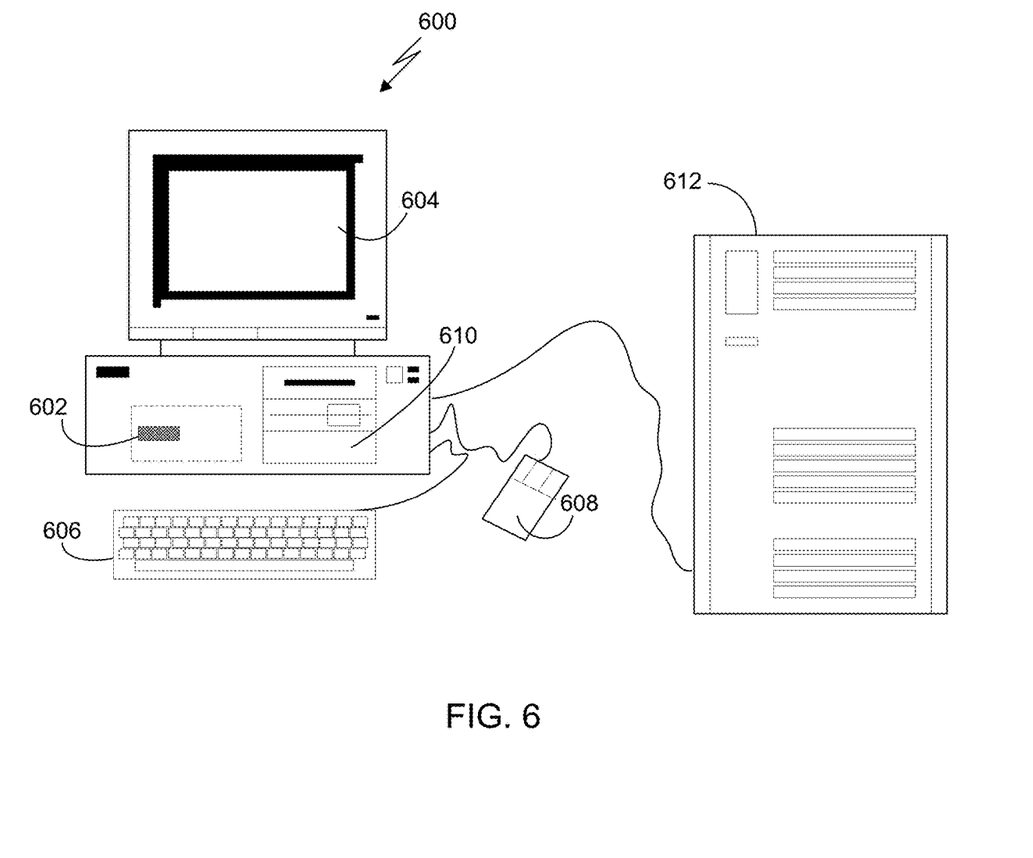
FIG. 6 is a schematic diagram of a computer system in which embodiments of the present invention may be implemented.

FIG. 6 illustrates a computerized system 600 that includes a CPU 602, a computer monitor 604, a keyboard input device 606, a mouse input device 608, and a storage device 610. The CPU 602, computer monitor 604, keyboard 606, mouse 608, and storage device 610 can include commonly available computer hardware devices. For example, the CPU 602 can include an Intel-based processor. The mouse 608 may have conventional left and right buttons that the design engineer may press to issue a command to a software program being executed by the CPU 602. As an alternative or in addition to the mouse 608, the computerized modeling system 600 can include a pointing device such as a mouse, a stylus, a touch-sensitive pad, or a pointing device and buttons built into the keyboard 606. Those of ordinary skill in the art appreciate that the same results described herein with reference to a mouse device can be achieved using another available pointing device. Other appropriate computer hardware platforms are suitable as will become apparent from the discussion herein. Such computer hardware platforms are preferably capable of operating the Microsoft Windows® 7 or Windows® 10, UNIX, Linux, or MAC OS or IOS operating systems.

Additional computer processing units and hardware devices (e.g., rapid prototyping, video, and 3D printing devices) may be included in the computerized modeling system 600. Furthermore, the computerized modeling system 600 may include network hardware and software thereby enabling communication to a hardware platform 612, and facilitating communication between numerous computer systems that include a CPU and a storage system, among other computer components.

Computer-aided modeling software may be stored on the storage device 610 and loaded into and executed by the CPU 602. The modeling software allows a design engineer to create and modify a 3D model and implements aspects of the invention described herein. The CPU 602 uses the computer monitor 604 to display a 3D model and other aspects thereof as described. Using the keyboard 606 and the mouse 608, the design engineer can enter and modify data associated with the 3D model. The CPU 602 accepts and processes input from the keyboard 606 and mouse 608. The CPU 602 processes the input along with the data associated with the 3D model and makes corresponding and appropriate changes to that which is displayed on the computer monitor 604 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, tablets, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

The proposed solution described herein can increase the number of personalized products manufactured by a vendor since each manufactured piece does not need to involve a graphic designer. Furthermore, the personalized product may be automatically manufactured using data created directly from the 3D model (e.g., 3D printer data, numerical control data, robot instructions). Thus, the proposed solution lowers manufacturing costs by streamlining the process beginning with specifying the personalization through the manufacture of the personalized product.

Yet another advantage of the present invention is that the user has a what-you see-is-what-you get (WYSIWYG) experience. By arranging the symbols in their relative positions, positioning the symbols, changing the thickness of the symbols, and orienting each symbol individually, the user experience is enhanced compared to the current state of the art that only offers two-dimensional static images of non-customized products, that does not allow the user to manipulate the graphical representation of a customized product using the six degrees of freedom, and that does not allow the user to manipulate individual symbols using six degrees of freedom. The present invention enables those unskilled in computer-aided design techniques to readily personalize a representation of a product using a browser on any computerized device. Moreover, the volume of material required is known, so the retail price can be established in full knowledge of the specific piece, and not as an average cost to manufacture or the greatest cost to manufacture.

A number of embodiments of the present invention have been described. Nevertheless, it will be understood by those skilled in the art that various modifications may be made within the boundaries of the invention. For example, embodiments of the present invention may change the order in which operations are performed. In work flow 500, the personalization may be a back-and-forth procedure in which the user may choose a 3D font, input the symbols, position and scale the symbols, then choose another font, change the position and scale of the symbols again, etc. Furthermore, depending on the needs of an implementation, particular operations described herein may be implemented as a combined operation, eliminated, added to, or otherwise rearranged.

What is claimed is:

1. A computer-implemented method for designing a personalized object on a computerized system, the method comprising:

creating in computer memory a three-dimensional (3D) model of the personalized object, wherein:
the personalized object is a representation of a real-world physical product;
the 3D model contains one or more symbol parts; and
a 3D font determines a shape of each symbol part;
providing a user interface to enable a user to specify the one or more symbol parts, wherein the specified one or more symbol parts indicate a personalization of the real-world physical product;
performing a transformation operation that transforms at least one symbol part of the specified one or more symbol parts of the 3D model, wherein:
the transformation operation enables the user to manipulate the at least one symbol part using six degrees of freedom; and
the transformation operation enables a user to visualize in three dimensions on a computer screen a representation of the real-world physical product with the personalization, such that the transformation operation results in the 3D model being a transformed 3D model;
performing a validation process that analyzes geometry of the transformed 3D model and determines whether the transformed 3D model is usable for manufacturing the real-world physical product; and
in response to the transformed 3D model being determined as usable, defining a manufacturing process to create the real-world physical product using data of the transformed 3D model;
the validation process including (i) analyzing the transformed 3D model to determine whether the transformed 3D model includes any gaps disallowed by the manufacturing process, and (ii) analyzing the transformed 3D model to ensure a sufficient thickness of the real-world physical product given a type of material to be used to manufacture the real-world physical product.

2. The computer-implemented method of claim 1, wherein the transformation operation transforms one symbol part of the 3D model simultaneously with at least one other symbol part of the 3D model, the transformation operation including changing a position or orientation of the symbol parts.

3. The computer-implemented method of claim 1, wherein the transformation operation transforms only one symbol part of the 3D model.

4. The computer-implemented method of claim 1, wherein the user interface enables a user to specify any one or combination of: the type of material, a 3D font type, a size of each symbol part, a position of each symbol part, and an orientation of each symbol part.

5. The computer-implemented method of claim 1, further comprising calculating a cost of the real-world physical product given a size of the 3D model.

6. The computer-implemented method of claim 5, wherein the cost is updated dynamically when at least one of a size of the 3D model changes and a different material is selected.

7. The computer-implemented method of claim 1, wherein the manufacturing process creates the real-world physical product by one of a 3D printing process, an engraving process, a stamping process, and an embroidering process.

8. The computer-implemented method of claim 1, further comprising:
enabling the user to specify the personalization within an online store; and
enabling the user to submit an order for the real-world physical product with the personalization.

9. The computer-implemented method of claim 1, wherein the transformation operation enables the user to draw a curve via the user interface, and includes automatically aligning the one or more symbol parts to the drawn curve.

10. A computer-aided design system comprising:
a processor operatively coupled to a data storage system, the data storage system storing a three-dimensional (3D) model; and
a data storage memory operatively coupled to the processor and comprising instructions to configure the processor to:
create in the data storage system the 3D model of a personalized object, wherein:
the personalized object is a representation of a real-world physical product;
the 3D model contains one or more symbol parts, wherein each of the one or more symbol parts is a computer representation of a symbol; and
a 3D font determines a shape of each of the symbol parts;
provide a user interface to enable a user to specify the one or more symbol parts, wherein the specified one or more symbol parts personalize the real-world physical product;
perform a transformation operation that transforms at least one symbol part of the specified one or more symbol parts of the 3D model, wherein:
the transformation operation produces movement of the at least one symbol part in any one of six degrees of freedom; and
the transformation operation enables a user to visualize in three dimensions on a computer screen a representation of the real-world physical product with the personalization, such that the transformation operation results in the 3D model being a transformed 3D model;
perform a validation process that analyzes geometry of the transformed 3D model and determines whether the transformed 3D model is usable for manufacturing the real-world physical product; and
in response to the transformed 3D model being determined as usable, define a manufacturing process to create the real-world physical product using data of the transformed 3D model;
the validation process including (i) analyzing the transformed 3D model to determine whether the transformed 3D model includes gaps disallowed by the manufacturing process, and (ii) analyzing the transformed 3D model to ensure a sufficient thickness of the real-world physical product given a type of material to be used to manufacture the real-world physical product.

11. The computer-aided design system of claim 10, wherein the user interface enables a user to specify any one or combination of: the type of material, a 3D font type, a size of each symbol part, a position of each symbol part, and an orientation of each symbol part.

12. The computer-aided design system of claim 10, wherein the transformation operation transforms only one symbol part of the 3D model changing one of a size, a position, and an orientation of the one symbol part to further customize the personalization.

13. The computer-aided design system of claim 10, further comprising transmitting data defining a manufacturing process for creating the real-world physical product, wherein the manufacturing process creates the real-world physical product by one of a 3D printing process, an engraving process, a stamping process, and an embroidering process.

14. The computer-aided design system of claim 10, further comprising:
enabling the user to specify the personalization within an online store; and
enabling the user to submit an order for the real-world physical product with the personalization.

15. A non-transitory computer-readable data storage medium comprising instructions causing a computer to:
create in computer memory a three-dimensional (3D) model of a personalized object, wherein:
the personalized object is a representation of a real-world physical product;
the 3D model contains one or more symbol parts, wherein each of the one or more symbol parts is a computer representation of a symbol; and
a 3D font determines a shape of each of the one or more symbol parts;
provide a user interface to enable a user to specify the one or more symbol parts, wherein the specified one or more symbol parts personalize the real-world physical product;
perform a transformation operation that transforms at least one symbol part of the specified one or more symbol parts of the 3D model, wherein:
the transformation operation causes a motion of the at least one symbol part in any one of six degrees of freedom; and
the transformation operation enables a user to visualize in three dimensions on a computer screen a representation of the real-world physical product with the personalization, such that the transformation operation results in the 3D model being a transformed 3D model;
perform a validation process that analyzes geometry of the transformed 3D model and determines whether the transformed 3D model is usable for manufacturing the real-world physical product; and
in response to the transformed 3D model being determined as usable, define a manufacturing process to create the real-world physical product using data of the transformed 3D model;
the validation process including (i) analyzing the transformed 3D model to determine whether the transformed 3D model includes gaps disallowed by the manufacturing process, and (ii) analyzing the transformed 3D model to ensure a sufficient thickness of the real-world physical product given a type of material to be used to manufacture the real-world physical product.

16. The computer-readable data storage medium of claim 15, wherein the user interface enables a user to specify any one or combination of: the type of material, a 3D font type, a size of each symbol part, a position of each symbol part, and an orientation of each symbol part.

17. The computer-readable data storage medium of claim 15, wherein the transformation operation transforms only one symbol part of the 3D model changing one of a size, a position, and an orientation of the one symbol part to further customize the personalization.

18. The computer-readable data storage medium of claim 15, further comprising transmitting data defining a manufacturing process for creating the real-world physical product, wherein the manufacturing process creates the real-world physical object by one of a 3D printing process, an engraving process, a stamping process, and an embroidering process.

19. The computer-readable data storage medium of claim 15, further comprising calculating a cost of the real-world physical product given a size of the 3D model.

20. The computer-readable data storage medium of claim 15, further comprising:
enabling the user to specify the personalization within an online store; and
enabling the user to submit an order for the real-world physical product with the personalization.

* * * * *